June 14, 1927.

E. RATHBUN 1,632,349

GOVERNOR REGULATOR

Filed Aug. 26, 1926

3 Sheets-Sheet 3

INVENTOR
Edward Rathbun
BY Herbert Ogden
HIS ATTORNEY.

Patented June 14, 1927.

1,632,349

UNITED STATES PATENT OFFICE.

EDWARD RATHBUN, OF TOLEDO, OHIO, ASSIGNOR TO INGERSOLL-RAND COMPANY, OF JERSEY CITY, NEW JERSEY, A CORPORATION OF NEW JERSEY, AND THE RATHBUN-JONES ENGINEERING COMPANY, OF TOLEDO, OHIO, A CORPORATION OF OHIO.

GOVERNOR REGULATOR.

Application filed August 26, 1926. Serial No. 131,660.

This invention relates to a governor regulator applicable to any prime mover, whether actuated by steam, gas, oil or other motive power, and having a spring loaded centrifugal governor for its control, so that the speed of the engine may be varied from maximum to minimum in accordance with the requirements of the work for which the engine is utilized. For purposes of illustration the invention is shown applied to an internal combustion engine driven, compressing or pumping unit as for instance, an engine connected to drive a compressor for compressing illuminating gas or for boosting the pressure in gas mains to maintain the pressure in the mains substantially constant.

The objects of the invention are to enable the speed of the engine to be controlled between maximum and minimum in accordance with variations of pressure in the gas mains or other source of pressure fluid, which is supplied by the compressing unit.

Other objects of the invention are to enable the load on the governor to be controlled by a device herein called a controller actuated by oil or other suitable liquid under pressure, while said controller is in turn regulated by a regulating device responsive to variations of pressure in the gas mains for instance. A suitable valve or other automatic device actuated by the regulating device, controls the connections for oil under pressure leading to the oil actuated controller and by this means the regulating device operates to change the characteristics of the governor only, and the governor in turn controls the prime mover in its usual and normal way.

The controller and regulating device together form a governor regulator which is simple and inexpensive, operates with certainty and precision and may be applied to many different forms of prime movers, having any suitable source of motive power.

Figure 1:
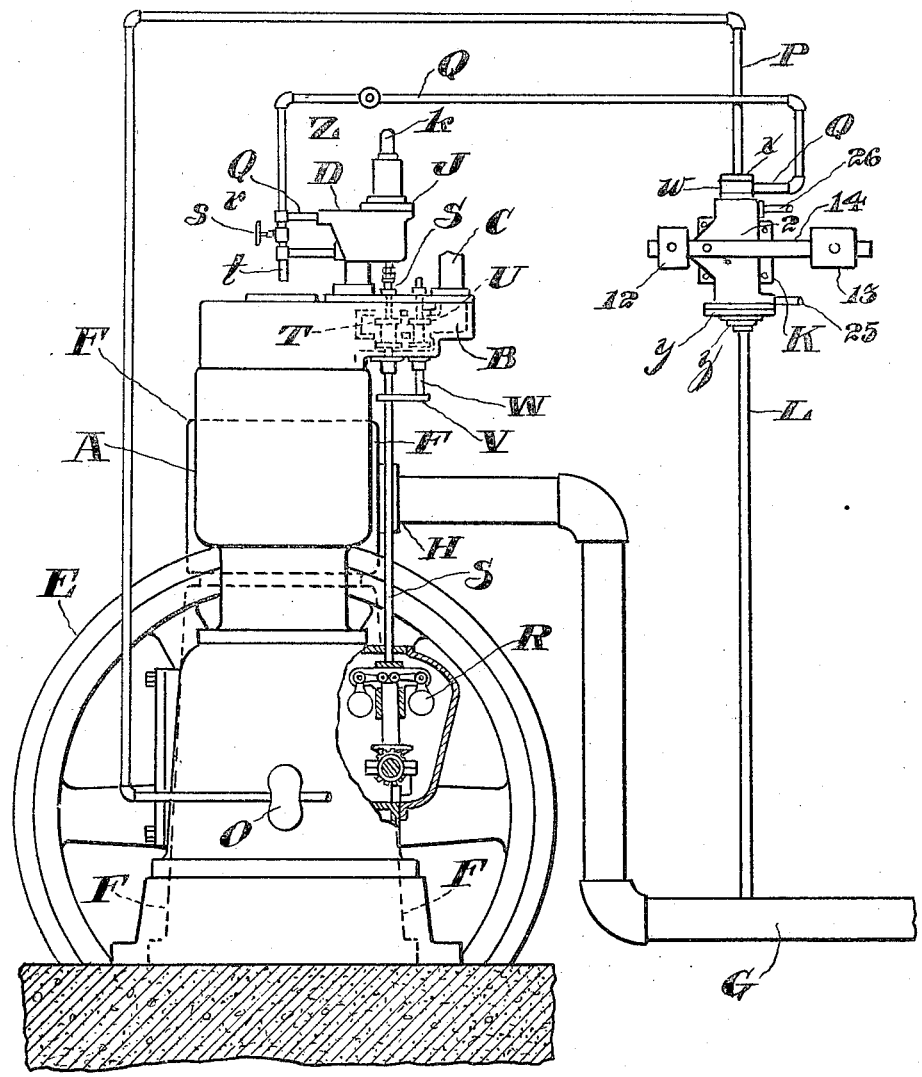
Figure 2:
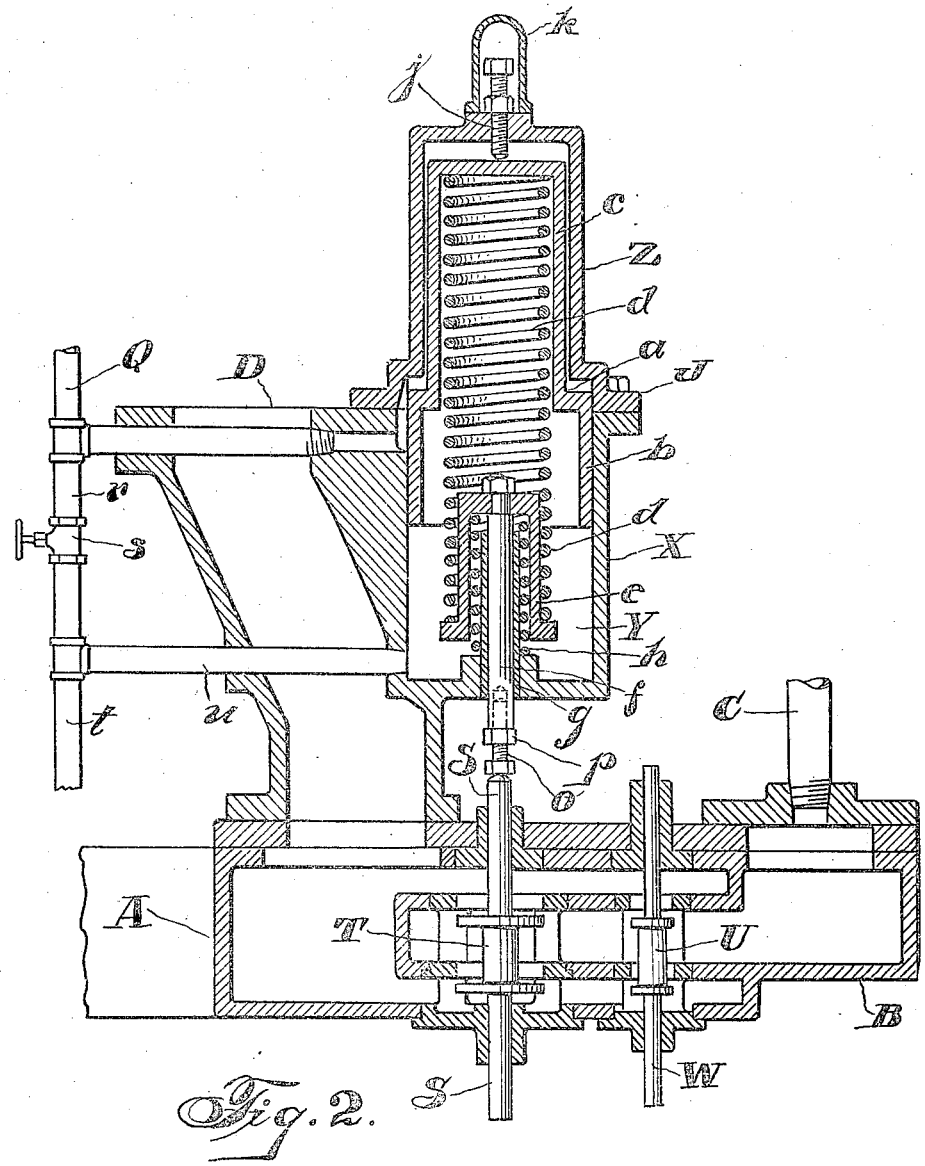
Figure 3:
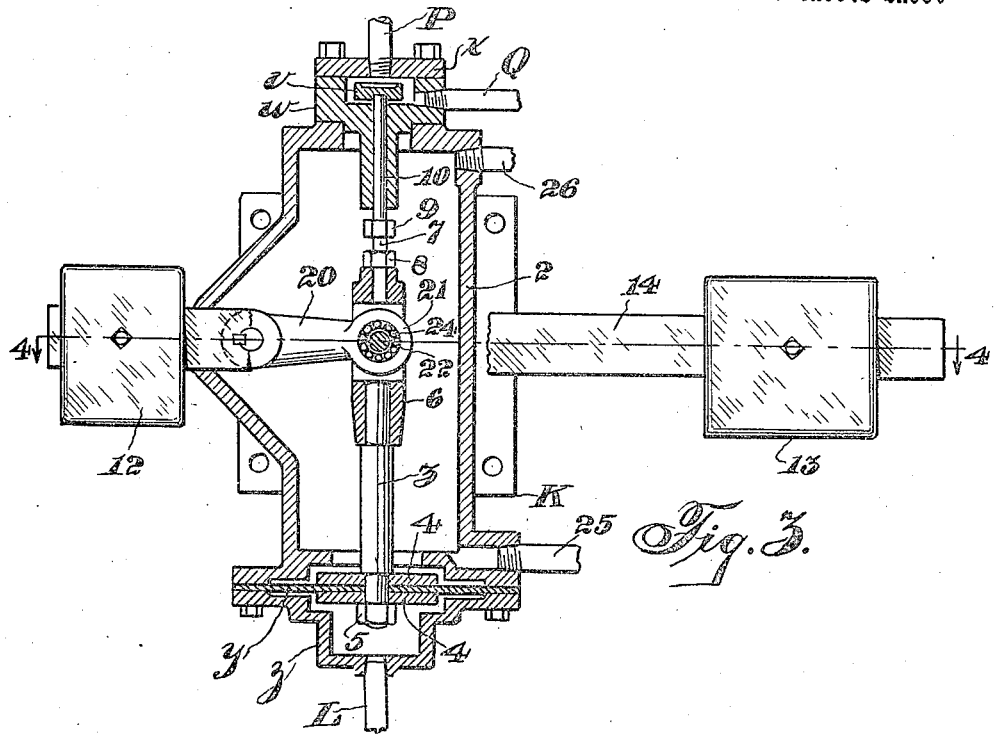
Figure 4:
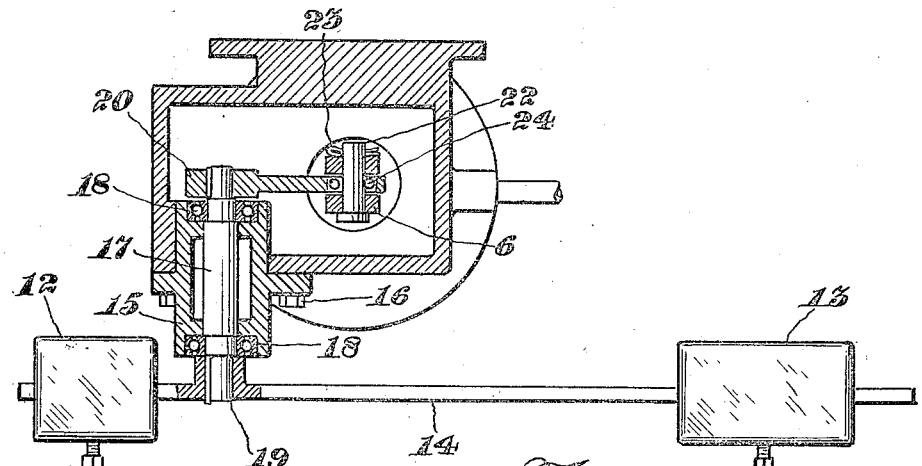

The invention is shown in one of its preferred forms in the accompanying drawings, in which Figure 1 is a diagrammatic side elevation of a combustion engine driven compressor unit supplying gas to gas mains, Figure 2 is an enlarged detail sectional elevation of the controlling device applied to the push rod of the governor and showing the details of the throttle, Figure 3 is an enlarged detail sectional elevation of the regulating device responsive to variations of pressure in the gas mains or other source of pressure fluid controlled by the engine, and Figure 4 is a horizontal sectional plan view on the line 4—4 of Figure 3 looking in the direction of the arrows.

Referring to the drawings and at first to Figure 1, A represents a combustion engine of any suitable type, in this instance it being understood that the engine is to be operated by illuminating gas as a source of fuel, the gas being supplied to the intake manifold B through the inlet C and air being supplied at the air inlet D.

The fly wheel of the combustion engine is indicated in full lines at E and the engine is coupled in any suitable manner (not shown), to operate a compressor F, in this instance shown of the vertical type and indicated partly hidden away behind the engine. The gas main G into which the compressor delivers gas is connected to the compressor at the discharge outlet H. Further details of the compressor are not indicated as being unnecessary for the disclosure of the invention.

An oil pressure actuated controlling device J is shown in this instance mounted on the intake manifold of the engine and a regulating device K is located in any convenient position near the engine as desired. The regulating device is responsive to the pressure in the gas main G by means of the pipe L, and O represents any suitable pump which may be driven by the engine and is connected by the pipe connection P to the regulating device K. The connection Q leads the oil under pressure from the regulating device to the controlling device J. The engine is provided with a suitable centrifugal governor having the governor balls R and the push rod S which extends upwardly through the intake manifold B and projects slightly beyond said manifold. The throttle valve T is connected to this push rod in the usual manner and controls the intake of air. The fuel valve U controls the supply of fuel and the push rod S is connected to the valve stem W of the fuel valve by the yoke V so that these two valves are operated together.

The controlling device J preferably comprises the casing X which includes the air intake D and is formed with a chamber Y in its lower portion. A cover Z is suitably secured to the casing X and forms an upper chamber of smaller diameter than the lower chamber Y. A hollow piston $a$ having two diameters $b$ and $c$ is slidable within the casing and cover and a main compression spring $d$ is located in the piston $a$ and carried on the spring seat or saddle $e$. This spring seat is supported on the upper end of the piston rod or stem $f$ which is vertically slidable in the piston rod guide or sleeve $g$. A lighter reaction spring $h$ is preferably located around the guide $g$ inside the spring seat $e$, and is only intended to take the weight of the parts supported on the spring seat $e$, and thus permit of a little lower minimum speed than otherwise, as will appear.

An adjustable stop or screw $j$ is provided at the top of the cover Z and a cover cap $k$ for protective purposes is arranged over the adjusting screw. A cap screw $o$ is adjustable at the lower end of the stem $f$ and is held in position by the lock nut $p$. The head $q$ of the cap screw $o$ is adapted to bear upon the governor push rod S so that when the piston $a$ is forced downwardly by oil under pressure for instance, the push rod S is loaded which places increased load on the governor, and the governor in turn acts to control the throttle. Oil under pressure is supplied through the pipe Q to the upper portion of the piston $a$ and the upward travel of the piston is limited by the adjusting screw $j$. The piston may descend until it rests upon the bottom of the chamber Y in the casing X.

When the oil under pressure is cut off by the regulating device K in the manner to be described, the piston $a$ is permitted to rise under the influence of the spring $d$, in which case the oil above the piston is permitted to pass out through the pipe $r$ and needle valve $s$ to the outlet pipe $t$ which may be led to the engine sump or to a drain. Any oil collecting in the lower chamber Y of the casing X may drain out through the pipe $t$. The needle valve or bleeder valve $s$ will be set at the desired opening to permit the piston $a$ to rise at the desired rate, but any other suitable bleeder valve or connection may be provided for this purpose. When the piston $a$ is at the upper end of its travel against the stop $j$ the load on the engine governor will be relieved. The running speed of the engine will be determined by the point at which the piston $a$ comes to rest in its travel either upwardly or downwardly, depending upon the pressure of the oil supply from the regulator K.

The pressure of the oil is controlled by the regulating device K in the upper portion of which there is a valve $v$ movable in a valve chamber in the valve body $w$. The oil pipe P from the pump O supplies oil to the valve chamber through the cover plate $x$ and when the valve $v$ is down or retracted as shown in Figure 3, the oil under pressure may pass from the pipe P through the valve chamber to the pipe Q and thence to the controlling device J for carrying out the operations described in connection with said controller.

The controlling valve $v$ of the regulating device is actuated by means under the control of a diaphragm $y$ subjected to gas pressure in the main G conducted to the diaphragm through the pipe L.

The regulating device K comprises the housing 2 and the diaphragm $y$ is held between the housing and the cover plate $z$. A push rod 3 is connected to the diaphragm by means of the clamping plates 4 and the nut 5. This push rod 3 engages the lower end of the cross head 6. The upper end of the cross head is provided with an adjustable cap screw 7 having a locking nut 8 and the head 9 of the cap screw bears underneath the valve push rod 10 so that upward movement of the diaphragm push rod 3 due to increased pressure beneath the diaphragm from the gas main, will force the valve $v$ closed and reduced pressure beneath the diaphragm will permit the valve $v$ to open.

Counter-weights 12 and 13 on the adjusting bar 14 are applied to the cross head 6 and for this purpose a bearing housing 15 is secured to the main housing 2 as by means of the bolts 16 and in the bearing housing is mounted an adjusting bar spindle 17 preferably having the anti-friction bearings 18. The adjusting bar 14 is keyed to one end 19 of the spindle 17 and at the other end is keyed one end of a lever 20. The opposite end 21 of the lever 20 engages the cross head pin 22 and is held on said pin by the cotter pin 23. An anti-friction bearing 24 is preferably provided for the cross head pin connection of the lever 20 in order to reduce friction in the parts. Vertical movement of the cross head 6 due to variations of pressure under the diaphragm $y$, rock the lever 20 and impart movement to the adjusting bar 14 carrying the counter-weights so that the regulating device is delicately counter-weighted and may be adjusted to different pressure limits. The lower portion of the housing 2 is provided with a drain 25 to drain off any oil collecting in the housing and the upper portion of the housing is provided with the vent 26 which may be carried, if desired, to a point outside the building in which the unit is located in order to carry off any gas which may leak into the housing.

In the operation of the governor regulator, a reduction of pressure through the pipe L leading from the gas main to the diaphragm $y$ will permit the controlling valve $v$ to open, thus supplying oil under pressure to force the controller piston $a$ downwardly. If the piston is forced down to the extent of its travel compressing the spring $d$ the corresponding load will be placed on the governor and the throttle T will be opened widely by the governor so that the engine will operate at maximum speed. If the oil pressure above the piston $a$ is reduced to zero by the closing of the valve $v$ of the regulating device K due to increased pressure in the gas main, the piston $a$ of the controller will rise to the limit of its upward travel against the adjusting stop $j$ and the engine will slow down to its minimum speed. The minimum speed is determined by the adjustment of the stop $j$. The length of the saddle stem $f$ may be adjusted by means of the cap screw $o$ located between the stem and the governor push rod S which changes slightly the tension of the spring $d$ in order to adjust the engine speed to the desired maximum. When the piston $a$ is at the limit of its downward travel resting upon the casing X no excessive oil pressure on top of the piston will have any effect on the maximum speed.

In the present instance, assuming that the governor push rod S has a travel of about one half inch, then the throttle valve T is wide open when the push rod is at its lowest position and is shut when the push rod rises one half inch. Accordingly, the highest speed of the engine will occur when the engine load is the least, with the throttle normally closed and the governor push rod S together with the spring saddle $e$ at their highest positions. More tension is thus placed on the spring $d$ than if the saddle $e$ was at its lowest position corresponding to the full throttle opening. For this reason, when making the adjustment for highest speed, the load on the engine should be the least that will be used in practice. In like manner the low speed adjustment should be made for the maximum load condition.

In the operation of the apparatus, no dimensions or pressures have been given, but the following may be assumed as a concrete example addressed to those skilled in the art for clearness of description, since the operation of the regulating device is somewhat more complex than as briefly described above.

Let it be assumed that the effective area of the diaphragm $y$ is twenty square inches, in which case an increase in gas pressure of for instance eight ounces will cause a force of ten pounds to be exerted on the valve $v$, tending to close the valve. This valve $v$ as will be observed is made with all of its seat at the outer edge, so that there is little difference in the areas of its two faces. If the area of the valve $v$ is for instance one square inch, then with oil under pressure of ten pounds at the pipe P, no oil will pass the valve and the oil in the pipe Q and above the piston $a$ of the governor control will be under no pressure, except that caused by the spring $d$. The bleeder $s$ of the governor control then gradually drains the system and the piston $a$ rises to the upper limit of its travel.

Next, assume that the pressure of the gas on the diaphragm $y$ drops four ounces. The force then acting on the valve $v$ exerted by the diaphragm is five pounds instead of ten pounds, but the supply oil pressure in pipe P is still ten pounds, so that oil will now flow into the system until the pressure reaches five pounds. This pressure on the under side of the valve $v$ combined with the five pounds exerted by the unbalanced force from the diaphragm $y$, equals the ten pounds exerted on the top of the valve $v$ by the oil in pipe P and no further rise in pressure in the system takes place. With five pounds pressure in the system, the spring $d$ of the governor control is compressed to approximately its mid position, and the engine runs at for instance 225 revolutions per minute, if its minimum speed is 150 and its maximum speed 300 revolutions per minute.

I claim:

1. A governor regulator for the centrifugal governor of an engine driven compressor or pump unit, comprising a regulating device responsive to pressure from the source of pressure fluid supplied by the unit and to be maintained at substantially constant pressure by varying the speed of the engine, a source of oil under pressure and connections from said source to the regulating device controlled by said device, and a controlling device operated by said oil under pressure and adapted to vary the load on the governor, said controlling device comprising a casing, a stem movable in the lower portion of the casing and supported on the governor push rod, a compression spring supported by said stem, and a hollow piston carried by said spring, whereby variations in pressure in the source of pressure fluid supplied by the compressor unit, cause the said controlling device to change the characteristics of the governor, which in turn varies the speed of the engine as required.

2. A governor regulator for the centrifugal governor of an engine driven gas compressor or pump unit, for maintaining substantially constant pressure in gas mains, comprising a regulating device responsive to pressure in said gas mains, a source of oil under pressure and connections from said source to said regulating device, a valve on the regulating device automatically controlling said connections, an oil actuated controlling device adapted to vary the load on the centrifugal governor, said controlling device comprising a casing, a stem movable in the lower portion of the casing and supported on the governor push rod, a compression spring supported by said stem, and a hollow piston carried by said spring, and oil pressure connections from the valve of the regulating device to the controlling device, whereby the speed of the engine is varied in accordance with variations of pressure in the gas mains.

3. A governor regulator for the centrifugal governor of an engine, comprising an oil actuated controller adapted to vary the load on the governor and thereby control the engine throttle, said controller comprising a casing having chambers of different diameter, a stem movable in the lower portion of the casing and supported on the governor push rod, a saddle on said stem, a compression spring supported by said saddle, and a hollow piston having two diameters carried by said spring, a source of oil under pressure, and a regulating device responsive to the pressure of a source of pressure fluid to be maintained substantially constant, said regulating device having an automatically actuated valve controlling the source of oil under pressure, whereby the engine speed is varied in accordance with variations of pressure in said source of pressure fluid.

4. A governor regulator for the centrifugal governor of an engine, comprising a controlling device actuated by oil under pressure for varying the load on the governor, said controller comprising a casing having chambers of different diameter, a stem movable in the lower portion of the casing and supported on the governor push rod, a saddle on said stem, a compression spring supported by said saddle, and a hollow piston having two diameters carried by said spring, a regulating device responsive to the pressure of pressure fluid in a source controlled by the engine, a source of oil under pressure, connections between said source of oil under pressure and the regulating device and the controlling device, and a valve in said connections adapted to be automatically opened and closed by the regulating device in accordance with variations of pressure in said source controlled by the engine, whereby the opening of the valve causes maximum engine speed and the closing of the valve causes minimum engine speed.

5. A governor regulator for varying the load on the centrifugal governor of an engine, comprising a controller casing mounted on the engine, an oil pressure actuated plunger in said casing having two diameters adapted to increase or decrease the load on the push rod of the governor and thereby change the characteristics of the governor, a main compression spring inside said plunger, a spring supporting saddle, a reaction spring supporting said saddle, and a regulating device subject to variations of pressure fluid in a source controlled by the engine, said regulating device having a valve controlling the flow of oil under pressure to said controller plunger.

In testimony whereof I have signed this specification.

EDWARD RATHBUN.